United States Patent Office 3,578,586
Patented May 11, 1971

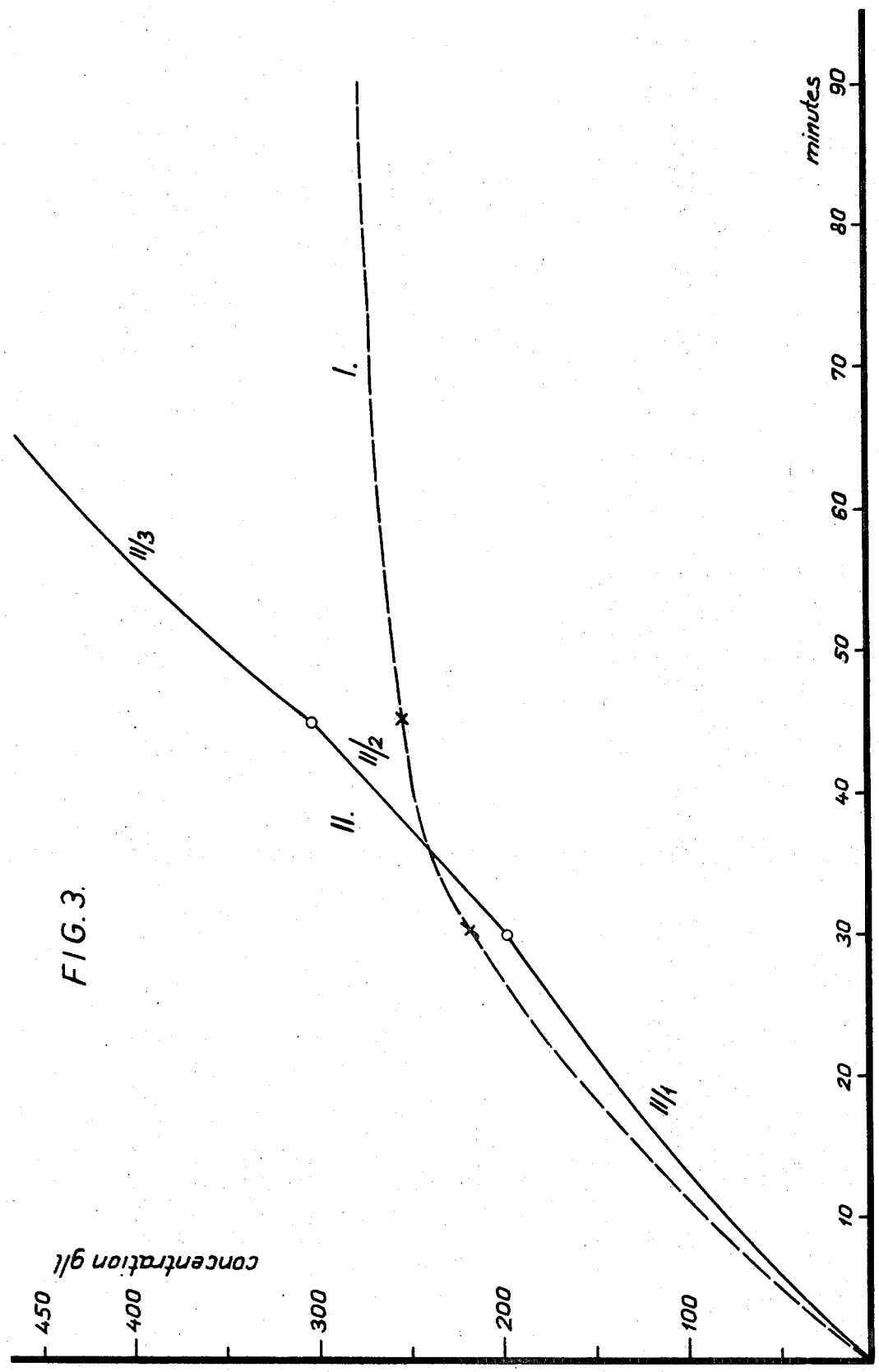

3,578,586
TREATMENT OF SLURRIES
István Gál, János Holló, Jenö Toth, and István Zagyvai, Budapest, Hungary, and Béla Galgoczi, deceased, late of Budapest, Hungary, by Katalin Galgaczi, trustee, Budapest, Hungary, assignors to Simonacco Limited, Cumberland, England
Continuation-in-part of application Ser. No. 624,331, Mar. 20, 1967. This application June 20, 1969, Ser. No. 835,315
Claims priority, application Hungary, Mar. 24, 1966, GA-803
Int. Cl. B01d 21/01
U.S. Cl. 210—49                                      7 Claims

ABSTRACT OF THE DISCLOSURE

A method and equipment for treatment and dewatering of aqueous suspensions containing finely divided mineral solids having a particle size not greater than 30 microns wherein the aqueous suspensions is treated with a polyelectrolyte having a molecular weight of from 10,000 to 10,000,000 in at least two steps which comprises diluting the solids content of the suspension with water to a solids content to 2 to 5% by weight, treating the suspension under vigorous stirring with an aqueous solution of an amphoteric polyelectrolyte, conducting the treated suspension under continuous flow to a first settling zone and adding a further amount of polyelectrolyte for increasing the structural viscosity of the settled phase to an extent of at least 10,000 centipoises, separating water, then diminishing the structural viscosity of the settled phase to an extent of not more than 2000 centipoises, separating further water, conducting the settled phase while intermixing a further amount of polyelectrolyte to a second settling zone, and finally dewatering it.

METHOD FOR IMPROVING THE TREATMENT OF SLURRIES

Figure 1:
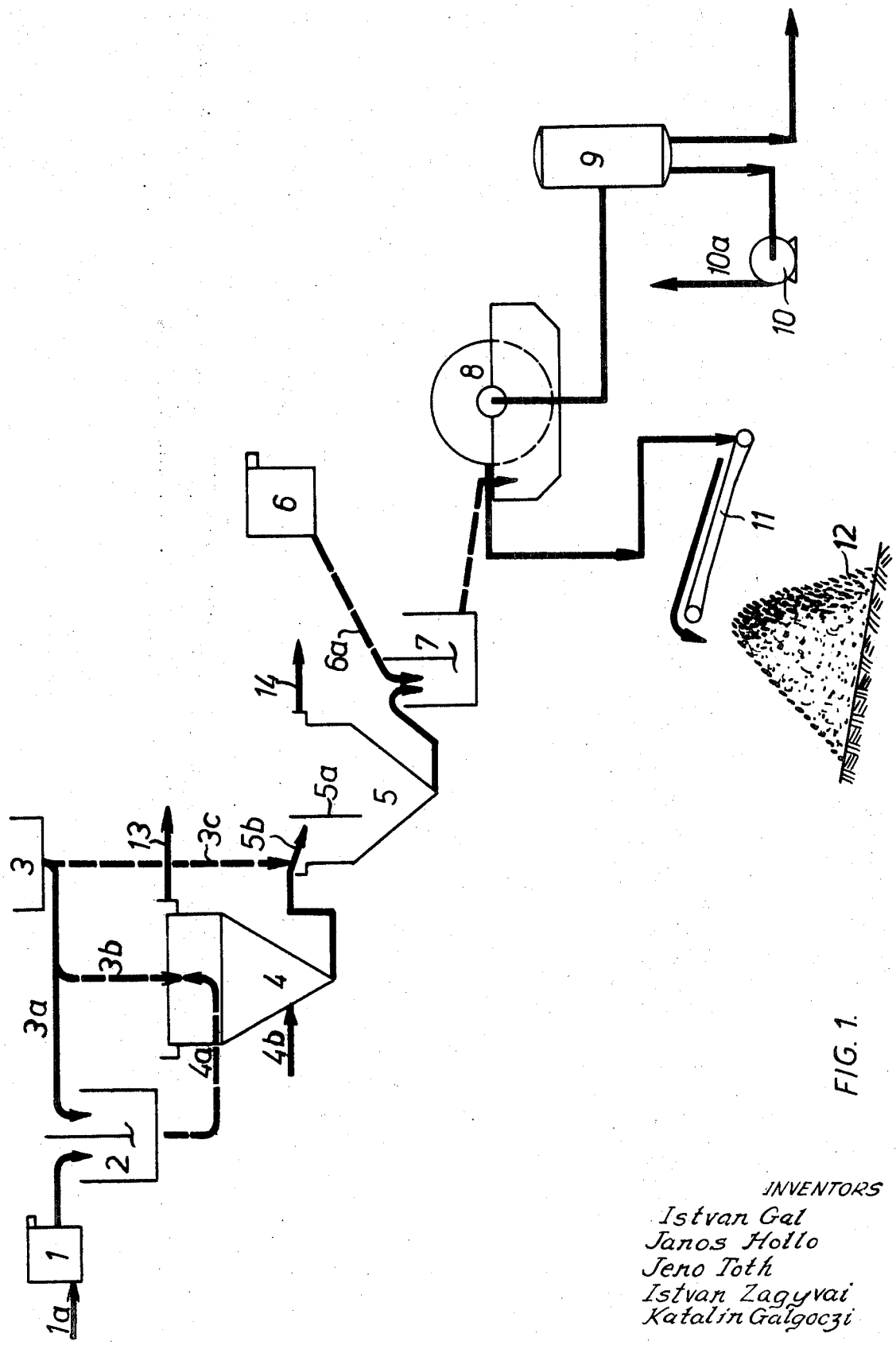

This application constitutes a continuation-in-part of copending application Ser. No. 624,331, filed Mar. 20, 1967, now abandoned, for Improvements in or Relating to the Treatment of Slurries.

BACKGROUND

This invention is concerned with improvements in or relating to the treatment of aqueous suspensions, particularly slurries.

In certain industrial processes for example coal preparation, mineral dressing or working up of flue dusts obtained in dust collectors of electrofilters, water/solids suspensions, if desired for further use, constitutes a very serious problem especially with suspensions containing very fine solids.

The settling of the suspended fine solids without auxiliary materials is extremely slow. Therefore in accordance with numerous processes known to the art flocculants of various type are used to promote settling. The flocculants especially proposed for this purpose are organic polyelectrolytes having a molecular weight of from 10,000 to about 10,000,000. Known processes of flocculation and working up of the flocculated slurry in order to prepare for thickening and dewatering do not involve distinct steps. These known processes involve only adding the polyelectrolyte, and then settling the flocculated slurry and separating it from water. The nature and quantity of the polyelectrolyte has to be varied generally according to the specific gravity and granular size of the solids to be settled. The settling of fine solids requires a considerable amount of polyelectrolyte, and in most cases the flocculated slurry cannot be filtrated.

The polyelectrolytes proposed for settling are mostly expensive chemicals, and processes based only on adding a polyelectrolyte to the suspension to be treated have proved to be economic only in limited cases. The solid matter content of the suspension is not regulated before the treatment with polyelectrolytes. Therefore sometimes on adding the polyelectrolyte a very dense settled phase is created which cannot be compacted further because the particles of the thickened slurry are very close to one another and they form a coherent layer called zone of compression or zone of compaction.

Adding further polyelectrolyte to the settled phase is unsuccessful because the aggregated flocs cannot be dewatered further by adding polyelectrolyte. Another drawback of processes known to the art is that they are carried out batchwise requiring settling tanks in large volume, and considerable energy. Further they are time-consuming.

SUMMARY

It is the major object of the invention to provide an improved method for compacting and dewatering suspensions containing fine solids.

A further object of the invention is to provide an improved method which can be carried out continuously and efficiently within a short period.

Another object of the invention is to provide novel equipment for treating suspensions containing fine slurries.

Figure 2:
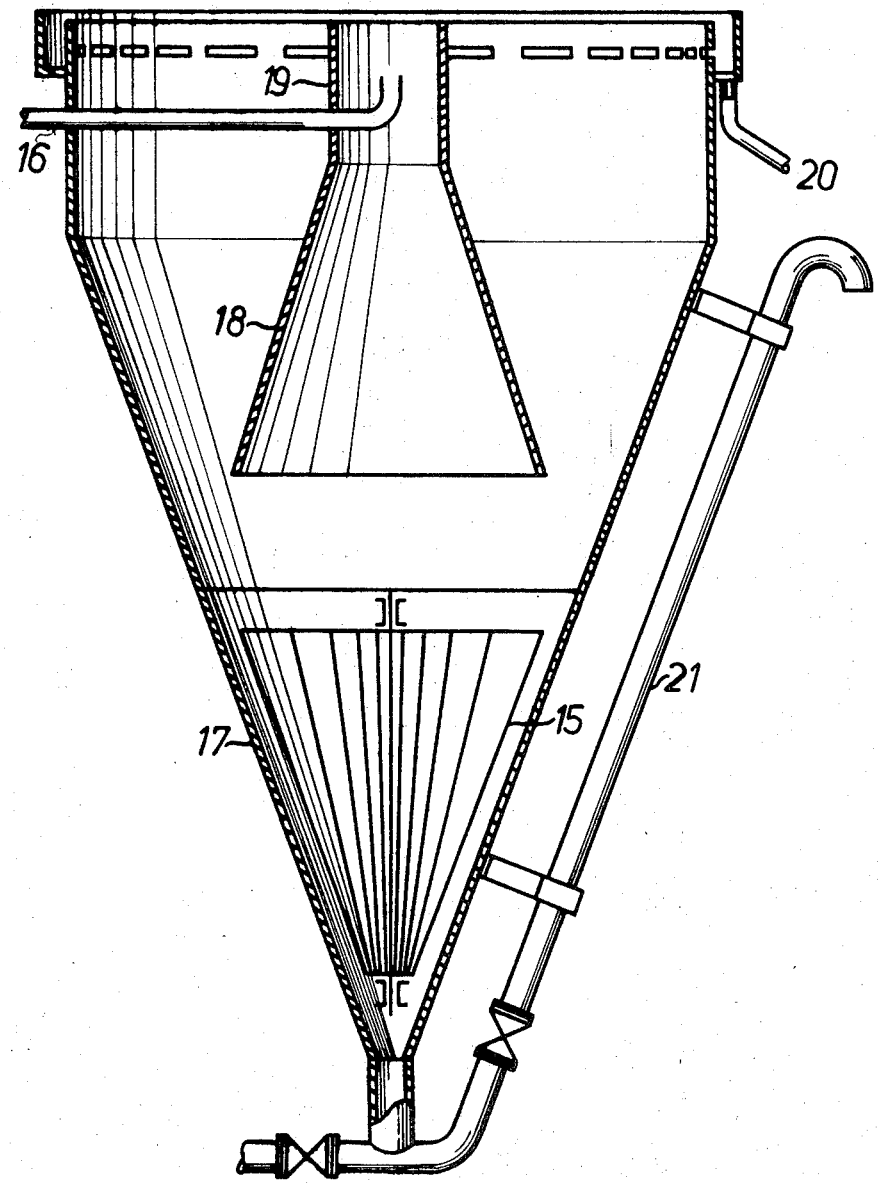

Other objects of the invention will be apparent from the following description, and the drawings wherein:

FIG. 1 is a flow diagram illustrating a plant for carrying out the invention; FIG. 2 is an enlarged elevation mainly in section showing a thickener used in the invention; and FIG. 3 is a graphical representation showing the advantages of the invention.

THE PROCESS OF THE INVENTION

It has been found that, in processes for treating suspensions containing fine solids, considerable improvement can be attained if the solid content of the suspension is adjusted before treating with a flocculant to a value which is less than the value that corresponds to the zone of compression. A further improvement resides in using polyelectrolytes of amphoteric character which are added in at least three separate portions to the suspension, conducting the suspension under continuous flow through separated zones, first increasing the structural viscosity of the settled phase to a certain value, and thereafter diminishing it, and if desired adjusting finally the pH-value of the settled phase to promote dewatering.

In a method for treatment and dewatering of suspensions containing finely divided mineral solids having a particle size not greater than 30 microns and having a specific weight between from about 1.5 to 3.2 g./cm.³, in which the aqueous suspension is treated with a polyelectrolyte having a molecular weight of from 10,000 to 10,000,000 in one or more steps, the improvements provided by the invention comprises diluting the solids content of the suspension with water to a value which is less than the value of the zone of compression, treating the suspension under vigorous stirring with an aqueous solution of an amphoteric polyelectrolyte, conducting the treated suspension under continuous flow to a settling zone and adding a further amount of polyelectrolyte, thus increasing the structural viscosity of the settled phase to an extent of at least 10,000 centipoises, separating the supernatant water, then diminishing the structural viscosity of the settled phase under the action of mechanical energy to an extent of not more than 2000 centipoises, separating further water conducting the settled phase while intermixing a further amount of polyelectrolyte to a second settling zone, and adjusting the pH-value of the settled phase between 10 and 12 by means of lime, thus dewatering it.

The invention also provides an improved method for treatment and dewatering suspensions containing finely divided mineral solids having a particle size not greater than 30 microns in which more than 50% by weight of the solids are of a particle size not more than 5 microns and having a specific weight between from about 1.5 to 3.2 g./cm.$^3$ in which the aqueous suspension is treated with a polyelectrolyte having a molecular weight of from 10,000 to 10,000,000 in one or more steps which comprises diluting the solids content of the suspension with water to a solid content of 2 to 5% by weight, treating the suspension under vigorous stirring with an aqueous solution of an amphoteric polyelectrolyte, conducting the treated suspension under continuous flow to a settling zone and adding a further amount of polyelectrolyte, thus increasing the structural viscosity of the settled phase to an extent of at least 10,000 centipoises, separating the supernatant water, then diminishing the structural viscosity of the settled phase under action of mechanical energy to an extent of not more than 2000 centipoises, separating further water and conducting the settled phase to a second settling zone while intermixing a further amount of polyelectrolyte, and finally dewatering it.

The invention also provides equipment constructed, arranged and adapted to operate in carrying out a method as set out in the foregoing.

The amphoteric polyelectrolyte is a chain-polymer compound such as a polyacrylamide-sodium polyacrylate copolymer having a molecular weight between 2,000,000 and 5,000,000. An example for the preparation of a suitable chain polymer polyelectrolyte compound is described in the U.S. Pat. No. 3,380,947. In addition, polyelectrolytes of natural origin can also be used, usually in a modified state. As polyelectrolytes of natural origin preferably the following are mentioned: gelatine, polypeptide, acacia gum, starch, alginates and dextrane. In the practice of the invention, grists of wheat, barley, rye, corn, horse chestnut, flours and grists of other agricultural products having a granular size of less than 30 mesh can be employed. The preparation of the modified natural products can be accomplished for example as follows:

The grists of grains are suspended in water. The quantity of water is calculated on the weight of the natural product and is at least 300% by weight. To the aqueous suspensions an aqueous solution of an inorganic base such as alkali-hydroxide is added in a quantity of from about 20 to 35% by weight, calculated on the weight of the starting material. The aqueous suspension treated with the alkaline solution is stirred at a temperature of about 30° C. for one or two hours. After stirring, monochloric acetic acid is added to the aqueous suspension in an equivalent weight and the obtained jelly-like product is diluted, before use, to an active matter content of about 1% by weight. The dilution with water is preferably carried out by means of a colloid mill in which the jelly-like product is diluted with water to a desired extent.

The modified natural products as described herein are considered amphoteric, chain-polymer polyelectrolytes having a molecular weight more than 100,000 and having functional groups on side-chains, and molar cohesive increment of said functional groups are each between 9 and 13 kilocalories per mole. The molar cohesion increment of the functional groups contained in the polymers is such part of the cohesive power within the molecule that can be calculated on each functional group. The theory and equation relating to the molar cohesion increment is described in the book of Herbert Adalbert Stuart: "Die Physik der Hochpolymere" Band I, "Das freie Makromolekul," Springer Verlag, 1953.

The aqueous solution of the polyelectrolytes is added in an amount from about 10 mg./kg. of solids to about 1500 mg./kg. of solids.

The dewatering of the settled phase can be carried out by means of filter presses, vacuum filters or by a centrifuge.

On carrying out the process, 40 and 60% by weight of the total polyelectrolyte added is added in the first settling zone of the suspension, and the remainder is added in the second settling zone.

On carrying out the process of the invention the following mechanism of floc formation and obtaining readily settling flocs has been established by way of example:

The settling and dewatering of suspensions containing fine mineral solids should be approached in a complex way considering the physical-chemical characteristics of the starting fine solids and of the flocs and aggregates obtained after treatment with polyelectrolyte. The surface electric charges of the solids consisting of fine particles are usually not the same. They may have both positive and negative charges. Therefore the employment of an amphoteric polyelectrolyte is in most cases optional, and they are able to collect and aggregate particles having positive and negative charges. The amphoteric polyelectrolytes contain functional groups having positive or negative character.

The addition of the amphoteric polyelectrolyte should be carried out stepwise in at least three portions.

The first portion of the polyelectrolyte is added under vigorous stirring while conducting the suspension and the polyelectrolyte in a turbulent flow condition in order to achieve the densification of the particles first formed into compact nuclei without cross-linked bonds. The granular size of these nuclei is always at least ten times larger than that of the starting particles. In general, having added the first portion of the polyelectrolyte, nuclei having a particle size of 100–300 microns are obtained.

The second portion of the polyelectrolyte is added to the suspension preferably by sprinkling or spraying, conducting the suspension substantially in a laminar flow to form aggregates containing cross-linked bonds, thus promoting settling of the solid phase. The loose structure of the aggregate comprises a large amount of water. The settled phase shows a thioxotropic character containing about 70% by weight of structural and solvate water. The solid content of the settled phase after the second addition of the polyelectrolyte is about ten times greater than that of the starting suspension.

In order to diminish the structural viscosity of the settled phase a gentle mechanical agitation is provided to transform the aggregate into a more dense solid phase having a micellar structure and in order to liberate further water. After separating the water, the settled phase is treated further with a third portion of polyelectrolyte while conducting the concentrated suspension in a turbulent flow. The resulting large flocs have a compact structure. The solid content of the concentrated suspension is about 40–50% by weight in this step, depending on the concentration of the starting suspension. In certain cases it has proved very advantageous to carry out an ion exchange on the surface of the particles of the concentrated suspension by means of hydrated lime, adjusting the pH value thereof to about 11.

The solvate hull of the particles can be decomposed and the resultant sludge can be filtered with a rate of about 100–300 kg./cm.$^2$/hour. The filter cake contains about 20–30% by weight moisture and can be conveyed in stable form. The operation time of the whole process is about 1½ hours in the equipment described hereinbelow. The separated water has a turbidity of 15–30 p.p.m. and can be used for various purposes without further purification.

PREFERRED APPARATUS

The plant shown in FIG. 1 comprises a tank 1 which serves for dilution of the starting suspension, a mixing tank 2 with impeller, a tank 3 for the polyelectrolyte, a primary thickener 4, a secondary thickener 5, a mixing tank 7 for treating with hydrated lime, a vacuum drum filter 8 and a conveyer 11.

In the operation of the plant, the starting suspension is diluted in tank 1 with water introduced along line 1a, until the concentration is less than the concentration of the zone of compression of the starting suspension. The diluted suspension from tank1 is pumped to tank 2 where an aqueous solution of polyelectrolyte from tank 3 is added to the diluted suspension along conduit 3a under vigorous stirring in tank 2. The treated suspension is then conducted to the upper section 4a of the primary thickener 4 where a second portion of the polyelectrolyte is added through conduit 3b in form of a spray. The suspension under continuous flow separates to a settled solid phase which moves towards the bottom 4b of the thickener 4, and the separated water is continuously removed through conduit 13. The solid phase collected in bottom 4b of the thickener where it is gently agitated as by means of a slat-type stirrer which is rotated with one rotation every 3–8 minutes, and the separated water rises and is similarly removed through conduit 13.

The thickened suspension from the primary thickener 4 passes under the action of gravity along a slip-way 5b to a secondary thickener 5 which has a certain conicity and is provided with a baffle plate 5a. In thickener 5, the treated suspension is intermixed with a third portion of polyelectrolyte, introduced through conduit 3c, under turbulent flow and clear water is removed along the line 14.

The thickened suspension from the thickener 5 passes to mixing tank 7 where hydrated lime from tank 6 is added through conduit 6a, for adjusting the pH-value. The thickened suspension is then conducted under the action of gravity to vacuum filter 8. The filter cake from filter 8 is carried by a conveyor 11 to a collection heap 12. The vacuum for the filter 8 is preferably provided by a liquid piston pump 10 of known type. Clear water from the filter 8 passen for further use via a vacuum surge tank 9 which is provided between the filter 8 and tank 10.

The primary thickener (FIG. 2) comprises an outer downwardly converging conical shell 17 and an inner upwardly converging conical shell 18. Each shell 17 and 18 has an angle of conicity of about 65–75°. The treated suspension from mixing tank 2 enters an upper section 19 of the inner shell 18 through a conduit 16, with overflow clear water removed through conduit 20. The lower section of the outer shell 17 is provided with a suitably motor driven slat-type stirrer 15, and the thickened suspension passes axially out of the lower section of the outer shell 17 into a syphon assembly 21, which leads to the secondary thickener 5. The slat-type stirrer 15 is operated with at very low speed as above indicated.

EXAMPLE I

Coal suspension

As starting suspension a sludge obtained in coal washing having a solids content of 120 grams per liter (g./l.) is used where the specific weight of the solids is about 1.95 g./cm.$^3$. Particle size: 90%<10 microns; 50%<1 micron; 3–5%=20–40 microns.

The sludge was diluted initially to a solids content of 50 g./l. An amphoteric copolymer of polyacrylamide and sodium polyacrylate having a molecular weight above 2,000,000 was added to the suspension in three portions in the ratio of 0.5 g./kg. solids of suspension. In the primary thickener, the concentration of the settled phase is about 200 g./l. and in the secondary thickener about 500 g./l. The pH-value of the sludge removed from the secondary thickener was adjusted to 11 by the addition of slaked lime in a ratio of 50 g. lime/kg. solids content. The moisture content of the obtained sludge without filtration was about 25% by weight.

EXAMPLE II

Flue dust suspension

As starting suspension, a sludge obtained from an electrofilter of a dust collector was used. The initial solids content of 50 g./l. of the suspension was diluted to 25 g./l. The specific weight of the solids is about 3.1 g./cm.$^3$. Particle size: 90%<20 microns; 70%<10 microns; 55%<5 microns.

An amphoteric copolymer of polyacrylamide and sodium polyacrylate having a molecular weight above 2,000,000 was added in form of an aqueous solution to the suspension in three portions in the ratio of 0.45 g./kg. solids of suspension. In the primary thickener, the concentration of the settled phase is about 300 g./l., and in the secondary thickener about 550 g./l. The pH-value of the sludge removed from the secondary thickener was adjusted to 10.5 by the addition of hydrated lime in a ratio of 50 g./kg. lime/solids content. The moisture content of the obtained sludge without filtration was about 27.5% by weight.

Comparative concentration rates of the starting sludge using the same amount of polyelectrolytes are shown graphically in FIG. 3, in the drawing. The II/1, II/2 and II/3 sections of Graph II show the attained concentration rates of the sludge in dependence of time when the polyelectrolyte was added in accordance with the invention in three separate portions. Graph I shows that the concentrating effect of the same amount of polyelectrolyte is much more limited when the polyelectrolyte was added in one portion.

EXAMPLE III

Clay suspension derived from Moroccan phosphate and containing bentonites, montmorrillonites and illites The initial solids content of the sludge was 40–50 g./l. and was diluted before treating to a concentration of 20 g./l. The specific weight of the solids was about 2.6 g./cm.$^3$. Particle size: 95%<30 microns; 60%<10 microns; 40%<2 microns.

The sludge was treated in a ratio of 15 g./kg. in form of an aqueous solution with a polyelectrolyte obtained from grist of grains in accordance with a method as described above. In the primary thickener, the concentration of the settled phase was about 250 g./l., and in the secondary thickener about 450 g./l. The pH-value of the sludge was adjusted to 11 with hydrated lime added in a ration of 50 g./kg. lime/solids content. The thickened sludge was filtrated on a vacuum filter where the filtration performance was 75–100 kg./square meter/hour. The moisture content of the filter cake was 32% by weight.

EXAMPLE IV

Fine coal suspension

As starting sludge a fine coal suspension, obtained by froth flotation of coal into a coal rich fraction of high calorific value and a clay rich tailings fraction of low calorific fraction, was used.

The solids content of the tailing fraction was diluted to 60–80 g./l.

| Cumulative weight, percentage: | Particle size (microns) |
|---|---|
| 500 | <99.23 |
| 200 | <98.31 |
| 100 | <96.86 |
| 63 | <94.95 |
| 45 | <92.10 |
| 25 | <60.97 |
| 15 | <12.10 |
| 5 | <1.42 |

The tailing fraction was treated in the plant illustrated in the drawings herein. The suspension leaving the primary thickener 4 had a solids content of 260 g./l. and that leaving the secondary thickener 5 had a solids content of 450 g./l. The quantity of polyelectrolyte prepared according to U.S. Pat. No. 3,380,947 was 350 g./ton of dry solids in the suspension treated. The polyelectrolyte was added in form of an aqueous solution having a concentration of 0.5% by weight, and 40% of this quantity was fed partly to mixing tank 2 and partly to primary thickener 4, and 60% into the secondary thickener 5. The thickened sludge was filtrated on disc filters. The moisture content of the filter cake was 27.5% by weight and this product can be burned in a boiler of a power station.

What is claimed is:

1. In a method for the treatment and dewatering of aqueous suspensions containing finely divided mineral solids having a particle size not greater than 30 microns and having a specific weight from about 1.5 to 3.2 g./cm.³ in which the aqueous suspension is treated with a polyelectrolyte having a molecular weight of from 10,000 to 10,000,000, the improvement which comprises diluting the solids content of the suspension with water to a value which is less than the value of the zone of compression, treating the suspension under vigorous stirring with an aqueous solution of an amphoteric polyelectrolyte, conducting the treated suspension under substantially continuous flow to a first settling zone and adding a further amount of polyelectrolyte for increasing the structural viscosity of the settled phase to an extent of at least 10,000 centipoises, separating the supernatant water, then diminishing the structural viscosity of the settled phase under the action of mechanical energy to an extent of not more than 2000 centipoises, separating further water, conducting the settled phase to a second settling zone, while intermixing a further amount of polyelectrolyte, adjusting the pH-value of the settled phase to between 10 and 12 by adding lime to promote dewatering.

2. In a method for the treatment and dewatering of aqueous suspensions containing finely divided mineral solids having a particle size not greater than 30 microns in which more than 50% by weight of the solids are of a particle size not more than 5 microns and having a specific weight between from about 1.5 to 3.2 g./cm.³ in which the aqueous suspension is treated with a polyelectrolyte having a molecular weight of from 10,000 to 10,000,000, the improvement which comprises diluting the solids content of the suspension with water to a solids content of about 2 to 5% by weight, treating the suspension under vigorous stirring with an aqueous solution of an amphoteric polyelectrolyte, conducting the treated suspension under continuous flow to a first settling zone and adding a further amount of polyelectrolyte for increasing the structural viscosity of the settled phase to an extent of at least 10,000 centipoises, separating the supernatant water, then diminishing the structural viscosity of the settled phase under the action of mechanical energy to an extent of not more than 2000 centipoises, separating further water, conducting the settled phase to a second settling zone while intermixing a further amount of polyelectrolyte, and finally dewatering it.

3. A method according to claim 1, wherein the polyelectrolyte is polyacrylamide-sodium polyacrylate copolymer having a molecular weight between 2,000,000 and 5,000,000.

4. A method according to claim 1, wherein the polyelectrolyte is a chain polymer compound having a molecular weight more than 100,000 and having functional groups on side chains, the molar cohesion increment of each of said functional groups being between 9 and 13 kilocalories/mole.

5. A method according to claim 1, wherein the aqueous solution of the polyelectrolyte is added in an amount from about 10 mg./kg. of solids content to about 1500 mg./kg. of solids content.

6. A method according to claim 1, wherein the dewatering of the settled phase is carried out by filtering with filter presses, vacuum filters or by centrifuge.

7. A method according to claim 1, wherein between 40 and 60% by weight of the total polyelectrolyte added is added in the first settling zone of the suspension and the remainder is added in the second settling zone.

References Cited
UNITED STATES PATENTS

| | | | |
|---|---|---|---|
| 2,293,028 | 8/1942 | Fischer | 210—73X |
| 2,941,942 | 6/1960 | Dahlstrom et al. | 210—53 |
| 3,079,331 | 2/1963 | Gieseke | 210—53 |
| 3,247,105 | 4/1966 | Gustafson | 210—49X |

JOHN ADEE, Primary Examiner

U.S. Cl. X.R.

210—51, 54